United States Patent
Watson et al.

[11] 3,898,209
[45] Aug. 5, 1975

[54] PROCESS FOR CONTROLLING RHEOLOGY OF $C_3+$ POLYOLEFINS

[75] Inventors: Albert T. Watson; Hulen L. Wilder; Kenneth W. Bartz; Robert A. Steinkamp, all of Baytown, Tex.

[73] Assignee: Exxon Research and Engineering Company, Linden, N.J.

[22] Filed: Nov. 21, 1973

[21] Appl. No.: 417,796

[52] U.S. Cl....... 260/93.7; 260/94.9 GC; 260/96 D; 264/83; 264/176 R
[51] Int. Cl.......................... C08f 27/22; C08f 27/26
[58] Field of Search............260/94.9 GC, 94.9 GA, 260/93.7, 94.7 D; 264/83, 176 R

[56] References Cited
UNITED STATES PATENTS

| | | |
|---|---|---|
| 2,911,384 | 11/1959 | Thompson et al................. 260/93.7 |
| 3,013,003 | 12/1961 | Maragliano et al................. 260/93.7 |
| 3,087,922 | 4/1963 | Whittington ................. 264/94.9 GC |
| 3,144,436 | 8/1964 | Greene et al...................... 260/93.7 |
| 3,551,943 | 1/1971 | Staton et al........................... 425/71 |
| 3,563,972 | 2/1971 | Kowalski..................... 260/94.9 GC |
| 3,608,001 | 9/1971 | Kowalski et al..................... 264/40 |

Primary Examiner—William F. Hamrock
Attorney, Agent, or Firm—David A. Roth

[57] ABSTRACT

The rheology of $C_3+$ polyolefins, e.g. polypropylene can be economically and conveniently controlled by injecting under pressure certain critical quantities of oxygen in an inert gas, e.g., air into melted polymer as it is being processed within an extruder.

9 Claims, 1 Drawing Figure

VISCOELASTIC GRID FOR POLYPROPYLENE FILM & FIBER RESINS

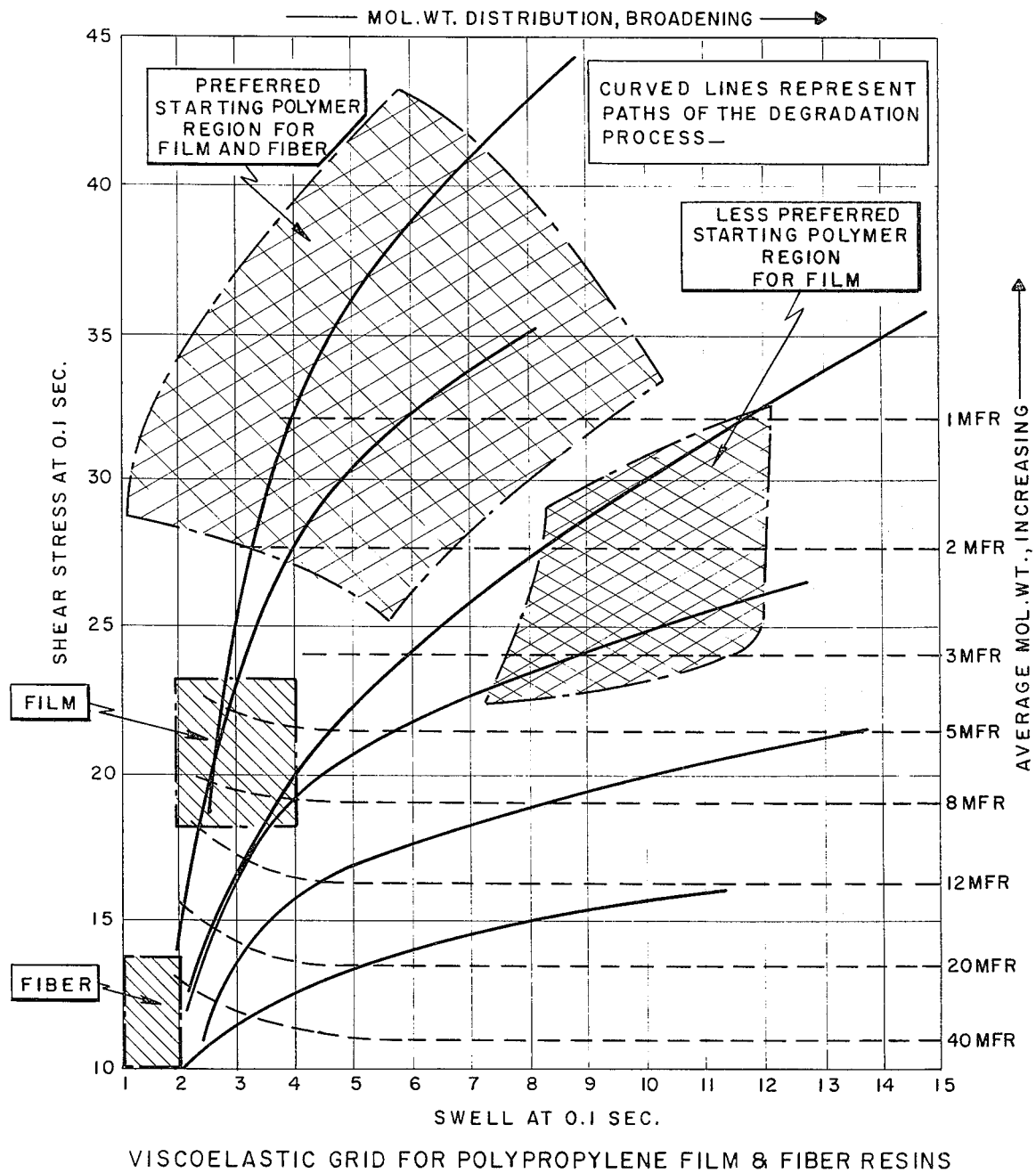
VISCOELASTIC GRID FOR POLYPROPYLENE FILM & FIBER RESINS

PROCESS FOR CONTROLLING RHEOLOGY OF C₃+ POLYOLEFINS

BACKGROUND OF THE INVENTION AND PRIOR ART

For many commercial end uses, the melt-flow characteristics of $C_3+$ polyolefins, especially polypropylene, are not suitable because of the extremely high molecular weight of such polymer as it is originally produced in the synthesis process.

Established uses where it has become well accepted that the melt-flow characteristics of a polyolefin such as polypropylene must be substantially changed are in the areas of fiber spinning, film formation, and non-woven melt-blowing. Exemplary of patents which teach the desirability of reducing polypropylene chain length to obtain more suitable melt-flow characteristics include Roberts et al., U.S. Pat. No. 3,143,584, Thompson et al., U.S. Pat. No. 2,911,384, Maragliano et al., U.S. Pat. No. 3,013,003.

Thus it has long been recognized that higher melt-flow characteristics can be controlled by oxidative chain scission which is effect reduces the molecular weight of the longer and thus higher molecular weight chains. The distorting effects on molecular weight distribution caused by the longer chains are then substantially decreased and thus the weight average molecular weight is decreased and also the die swell. This chain cleavage is normally accomplished by either oxygen or peroxides or other free radical sources.

The basic concept of accomplishing such degradation by utilizing peroxides is described in U.S. Pat. No. 3,144,436 where a free radical initiator is introduced into a polymer melt in the absence of oxygen in a screw extruder.

Although there are advantages in using peroxides such as the relatively low melt temperatures such as 450°–550° F. and the accomplishment of desired degradation with a single pass. The method also has severe disadvantages such as the cost of the peroxide, its handling costs for adding it to the process, the subsequent requirement that peroxide decomposition products be removed and the formation of undesirable gels which makes it difficult to meet commercial specifications.

Another manner of accomplishing the requisite chain scission is simply using the oxygen in the air which is entrained on the pellets or particles or powder of polyolefins as it is fed into the extruder. This method has been used for quite a few years. It was developed into an extremely sophisticated and practical process by co-inventors and co-workers of present applicants and was described in U.S. Pat. Nos. 3,563,972; 3,593,011; 3,551,943; 3,608,001 and Ser. No. 102,250, all of which are incorporated herein by reference and which the present invention is an improvement thereover.

The problem with the extruder degradation process in the above described applications is that for certain grades of polymer, e.g. polypropylene, particularly where it is to be used for fibers, the requisite melt viscosity or melt characteristics can not be achieved in a single pass through the extruder. It required at least two and usually three or four passes through an extruder before the precise commercially acceptable melt-viscosity was attained. It can be appreciated that each pass through an extruder adds unacceptable costs to the product. And it would be highly desirable to accomplish the requisite melt viscosity with a process which did not require increased costs, did not require the use of peroxide, and yet would produce the requisite melt rheology at a single pass and at no worse than two passes.

It should be noted that the melt-flow rheologies required for a polypropylene to be used for a film process and that to be used for a fiber process are somewhat different. The grade to be used for film can be more readily made utilizing the technique of the patents and application described above since the degree of degradation and scission need not be so great for a film grade polypropylene as it need be for a fiber grade polypropylene.

It is also of great importance to note at this juncture that degradation and chain scission is an extremely broad and vague term. One can degrade a polymer all the way down to "soup." The products which are produced by the extruder degradation process described above and that which is produced by the technique which is described herein as the instant invention possess carefully defined characteristics which must be met precisely with just the right amount of degradation, neither too much or too little, otherwise the specifications cannot be met. The essence of the invention is the realization of how to accomplish critical narrowly defined specifications with a minimum of cost and a minimum of undesirable side effects such as encountered with peroxide degradation.

SUMMARY OF THE DISCLOSURE

An improved process for preparing $C_3+$ polyolefins of predefined critical rheology which comprises injecting under pressure certain quantities of oxygen in an inert gas at defined temperatures into an enclosed chamber where the polymer is in a melt phase.

DETAILED DESCRIPTION OF THE INVENTION WITH PREFERRED EMBODIMENTS

It has been discovered and forms the essence of this invention that certain important rheological characteristics of $C_3+$ polyolefins, particularly polypropylene, can be beneficially and economically controlled through the use of an improved process. The process comprises the introduction of controlled amounts of oxygen under pressure into the melt-phase of the polymer at a certain temperature.

Commercial processes employing Ziegler-type catalysts such as titanium trichloride and aluminum diethyl chloride to produce polyolefins are well known. For example, a particularly suitable catalyst and process for making polypropylene is disclosed in U.S. Pat. No. 3,032,510.

It is quite common to use chain terminators or transfer agents when making polypropylene to control molecular weight but even the use of these agents does not usually adequately and conveniently control all of the parameters of molecular weight distribution of the polymers made. The molecular weight distribution as referred to herein is the ratio of the weight average molecular weight of $\overline{M}_w$ to the number average molecular weight of $\overline{M}_n$. The $\overline{M}_w$, $\overline{M}_n$ in a normal polypropylene process is usually above 4.5 and generally falls within a range of between about 4.5 to 8.5.

It is now known, according to U.S. Pat. No. 3,563,972 that the molecular weight distribution of polyolefins can be controlled so that at any level of melt viscosity, the polyolefin will have an extremely low level of melt elasticity.

A low level of melt elasticity makes the polyolefin, particularly polypropylene, suitable for use for fiber melt-spinning fibers, melt-blowing fibers (by methods known to the art such as described in U.S. Pat. Nos. 3,676,242; 3,650,866; and 3,615,995) film production. Extrusion coating and other utilities normally associated only with polyethylene are possible with polypropylenes which have suitably been modified to a low level of melt elasticity according to the preferred technique herein and others known to the art.

To illustrate, the resulting changed rheology of polypropylene made by the processes to be described herein permits the spinning of fibers which are unstrained immediately after being extruded. The lack of strain in the melt state, as contrasted to previously available polypropylene having a relatively high melt elasticity eliminates the cause of many fiber breakages, and also permits a much higher level of elongation and a subsequent cold drawing operation, resulting in significantly higher levels of tenacity in the in the finished product.

Another unique advantage resulting from the low elasticity level of the polypropylene composition made by the process of the present invention is that they can be extruded at a temperature of 100° F. or more below the extrusion temperature normally required in the melt-spinning of polypropylene of the same viscosity level.

Therefore, it is apparent that these polypropylenes can command a premium price and their economic and rapid production without concomitant property degradation is a highly desirable accomplishment.

The term $C_3+$ polyolefins includes solid high molecular weight polyolefins prepared from a preponderance of $C_3$ to $C_8$ olefins and copolymers thereof. Polypropylene is preferred. But, other polyolefins which can be processed according to the technique of the invention include: polybutene-1, poly-3-methylbutene-1, poly-4-methylpentene-1, propylene/4-methylpentene-1 copolymer, polyallomers and the like.

The melt-flow characteristics of a polymer are described by several technical terms. It would be useful at this juncture to pause and define these terms.

The term "Die Swell Ratio" is defined as the ratio of the outer parison diameter (or parison thickness) to the outer diameter of the die (or die gap). Die swell ratio is influenced by polymer type, head construction, land length, extrusion speed, temperature. This definition appears on page 35 of the 1970-71 *Modern Plastics Encyclopedia*.

"Shear stress" is defined as a stress development in a polymer melt when the layers in a cross-section are gliding along each other or along the wall of the channel (in laminar flow: shear stress = force ÷ area sheared). This definition appears at page 49 of the 1970-71 *Modern Plastics Encyclopedia*.

The term "melt-elasticity" is defined in terms of die swell. Thus a low melt-elasticity means a low die swell.

The molecular weight of a polymer can be defined in several different ways. One way, which has been described extensively in previous patent applications and publications, is shear stress. The technique of determining and measuring shear stress is set forth in detail in column 6, lines 19-75, and column 7, lines 1015 of U.S. Pat. No. 3,551,943 which is herein incorporated by reference in its entirety.

Shear stress is directly proportional to weight average molecular weight.

Die swell, melt elasticity and molecular weight distribution are all related concepts. The ratio of $\overline{M}_w$ to $\overline{M}_n$ is also correlatable with the die swell of the polymer.

Die swell can be further defined numerically as $(D_e/D_o)^2$ where $D_e$ is the diameter of the extrudate at the die exit and $D_o$ is the diameter of the die or in greater detail.

Die swell is defined in further detail as follows:

DIE SWELL

Some high molecular weight polymers such as polyolefins when forced through a capillary die of a relatively short length produce an extrudate of a larger diameter than the diameter of the capillary.

This property of polymers has been characterized as die swell which is expressed numerically as the ratio of the diameter of the extrudate to the diameter of the capillary (by some the ratio to the first power and by others to the second power).

The term "die swell" as used herein is defined as follows:

$$\text{die swell} = \left(\frac{D_e}{D_o}\right)^2$$

where:

$D_e$ is the extrudate diameter $D_o$ is the capillary diameter.

The numerical value of die swell is also dependent on the geometry of the rheometer used to force the polymar through the capillary.

In obtaining the numerical values set forth herein, and in the tables which follow, a rheometer having a rheometer barrel of ⅜ inch I.D. (inside diameter) was used wherein the barrel was heated to a temperature controlled to ±2° F. of the recorded temperature and the polymer was forced through a capillary having a 0.03018 inch I.D. and which was 1.006 inches long. The capillary had a 90° entry angle.

The measurements were made by forcing the polymer through the capillary by a plunger operating at a constant speed or a constant shear rate ($\overset{\circ}{Y}$) ranging from 13.5 reciprocal seconds to 338.3 reciprocal seconds ($sec^{-1}$). The polymer was forced through the capillary into ambient air at room temperature (70°-80° F.).

The measurement of die swell is frequently used as a gross measure of molecular weight distribution in polyolefins; high die swell resins possess broader molecular weight distribution than polymers having lower die swells.

Thus, the polymers made by the process of the invention have die swells lower than the base stock from which they were prepared; they are the product of a random chain scission process, which results in selective molecular weight decrease and hence possess narrower molecular weight distribution than the base polymers.

The ratio of $\overline{M}_w/\overline{M}_n$ is often referred to in the art in terms of molecular weight distribution. Thus a broad molecular weight distribution will result in a relatively large number, e.g., 3 to 8, whereas a narrow molecular weight distribution will result in a relatively low number, e.g., 1.5 to 2.8.

Since the scission processes referred to herein statistically tend to reduce the longer molecules to the average size of the molecules before scission, it can be seen that such scission processes generally tend to narrow molecular weight distribution.

Thus, polymer rheological properties are highly complex. Very generally they depend not only on the average molecular weight of the polymer but also on the molecular weight distribution (usually as measured by die swell) of the individual polymer molecules within the total gross polymer mass. Therefore, it is well known that a polymer having a narrow molecular weight distribution will behave very differently from a substance of the same general molecular weight, but having a much wider molecular weight distribution.

For a great many commercial applications, narrow molecular weight distributions are far more desirable than wider ones. For many elastomers and some low molecular weight plastics, the ratio of $\overline{M}_w/\overline{M}_n$ is useful for measuring molecular weight distribution. But die swell (hereinafter defined) is a much more useful measure. See U.S. Pat. No. 3,562,804 for a description of $\overline{M}_w/\overline{M}_n$ as a standard.

In general, narrow molecular weight distributions indicate a trend toward lower viscosities and improved flow properties.

Plainly, the best way of trying to obtain such a desirable narrow molecular weight distribution would be by direct synthesis of the material. That is, one would desirably control the polymerization in such a way that the desired narrow molecular weight distribution is obtained. Nevertheless, no really effective way of doing this during the synthesis of the polymer is known.

Hydrogen gas is often used as a chain terminator in a polypropylene synthesis. But it tends to broaden the molecular weight distribution as it lowers molecular weight.

Therefore, conventional techniques of trying to achieve molecular weight changes have taken the route of heating at high temperatures in order to thermally degrade the molecules. This can result in unpleasant odors with undesirable quality discolorations, but even more disadvantageous is the pronounced loss of process effectiveness at high temperatures.

Another method relies on the use of air with its atmospheric oxygen but this also has similar drawbacks, i.e., high temperatures result in considerably reduced product output. This air technique involves entraining air on either polypropylene pellets or powder prior to introducing into an extruder.

Directionally, in most instances, due to controlled degradation the length of the individual polymer molecules will all tend to become approximately the same, thus resulting in the desirable narrow molecular weight distribution as well as some concomitant reduction in molecular weights. Crystallinity and other desirable characteristics of the polymer are retained.

Another very important measurement of polymer rheology and molecular weight is described as meltflow rate (MFR).

The MFR of polyethylene (not a suitable polymer for this invention since it cross-links) is measured normally according to the ASTM text D-1238-65T. In this test the rate of extrusion in grams per 10 minutes (through an orifice 0.0825 inch in diameter and 0.315 inch in length) is determined for the polymer at 190° C. under the weight of a piston having a diameter of 0.373 inch and weighing, in combination with its plunger, 2,160 grams.

The melt flow rate (MFR) of polypropylene is determined by the same procedure except at a temperature of 230° C. according to ASTM D-1238-65T.

The apparatus utilized for determining melt index is defined in ASTM manual as a "dead-weight piston plastometer."

Generally speaking, polypropylene from a reactor will have MFR below 1, while polyethylene (in contrast) from a reactor can have a MFR at 190° C. of about 0.05 to 50. Thus, in comparison, polypropylenes are relatively very high molecular weight.

It is very important to re-emphasize the fact that the degradation concept used herein relates to a controlled phenomenon in which a starting polymer with certain narrowly defined molecular weight and die swell characteristics must be degraded in order to achieve certain dual parameters which will be discussed herein. Too little or too much degradation is entirely inappropriate.

The technique of this invention enables one to achieve these critical specific areas of polymer rheology in a most economical and efficient manner. Although previous patent applications and patents have described particular desired shear stress and die swell coordinates which are required, none of them have described this economical method for achieving polypropylenes satisfying two recently redefined parameter ranges.

The rheological parameters which characterize the difference between resins made by the novel process of the invention and resins obtained directly from the polymer synthesis are illustrated in a novel manner by means of a viscoelastic grid. A typical viscoelastic grid is shown in the FIGURE.

It can be seen that by plotting shear stress vs. swell that the relationship between molecular weight distribution and molecular weight (in terms of shear stress) with respect to the degradation of a particular polymer, is clearly illustrated.

It is also of extreme significance and is illustrated for the first time by the grid that even the characteristics of the starting polymer must be chosen with great care, because the polymer will degrade only along its predetermined particular degradation grid line.

Thus, if selected initial polymer's grid line will not pass through the particular rheology coordinates specified, then that polymer can never the degraded to arrive at the proper specified rheology coordinates.

The goal for a film grade polymer is to end up with rheology coordinates defined as a shear stress of about 19 to 23 at a die swell of about 2 to 4, preferably a shear stress of about 20 to 22, and a die swell of 1½ to 3½.

For fiber grade resins the target is rheology coordinates of a die swell range of −0.5 to 2, preferably 0.2 to 1.5, and most preferably 0.2 to 0.9 with a shear stress of 10 to 14, preferably 10 to 13, and most preferably 11 to 13.

The shear stress values can also be stated as Melt Flow Rates (MFR) as shown on the grid.

For film grade resins the MFR should be about 4 to 9, preferably 6 to 8, and most preferably 5.2 to 7.5.

For fiber grade resins the MFR should be 20 to 50, preferably 25 to 42, and most preferably 30 to 40.

For extrusion grade resins, competitive with low density polyethylene the MFR should be 40 to 60, preferably 45 to 55, and most preferably 45 to 50, with a die swell of 0.1 to 4, preferably 1 to 3, and most preferably 1 to 2.

The necessity for repetitive extrusions, which is eliminated by the present invention, not only results in higher manufacturing costs but also causes discoloration, e.g., yellowing of pellets and lower oxidation stability. These are severe disadvantages which mitigate against the cost premium which can be commanded by a product that does not suffer from these drawbacks.

Any type of conventional extruder can be employed in the process of the invention so long as adequate heating and adequate provision for the introduction of an oxygen-containing gas under pressure in the polymer melt is provided. For practical purposes a very convenient extruder is a single screw extruder having the conventional positive conveying zone at the feed port for introducing the feed which is in the form of pellets or powder.

Optionally heaters and heater controls might be added to provide the necessary temperature controls in the proper zones of the extruder.

The extruder has roughly four main zones. These are:
a. feed;
b. mixing-conveying;
c. transition;
d. metering.

The feed zone is that where the pellets or powder are transported through whatever environment is chosen. Generally, for the purposes of this invention, the environment is air. Whatever oxygen is entrained on the pellets or powder from the air contribute to the total process.

In the transition zone, the polymer is converted to a viscous mass and maintained under a shear and high temperature in order to propogate whatever reaction can be made to occur because of the oxygen containing gas through which the pellets or powder have passed.

The metering zone occupies the great preponderance of the extruder. In that zone the viscous polymer is pumped at reduced temperatures to the die. Hitherto, in U.S. Pat. No. 3,563,972, it was thought that the brunt of the reaction took place in the transition zone.

According to this invention, an additional reaction is made to take place in the cooler metering zone by virtue of pressure injecting oxygen containing gas therein at a relatively low temperature.

Thus, in the case of polypropylene, the temperaturue in the reaction zone is about 550° to 900° F., preferably 550° to 800° F., and most preferably 600° to 750° F.

In contrast, the temperature in the metering zone for the purposes of this invention when polypropylene is being exposed to chain scission, is about 350° to 500°, preferably 400° to 475°, and most preferably 400° to 450° F.

In general the temperature in the metering zone will run from at least 50° to 400°, preferably 50° to 250°, and most preferably 50° to 150° F. lower than the temperatures in said transition zone.

Although any oxygen containing gas can be injected into the metering section of the extruder, it is preferred under most polypropylene conditions that air be used. Thus, generally speaking, the oxygen content of the gas should be about 10 to 30, preferably 15 to 25, and most preferably 17 to 25 weight percent. Very generally, air can be used as a standard. If inadequate degradation results from the use of air, a certain percentage of oxygen can be added to the air in order to increase the chain scission to the proper degree.

The oxygen containing gas is injected at a pressure (gauge) of about 1,200 to 5,000, preferably 1,500 to 4,000, and most preferably 1,600 to 2,200 psig.

The rate (for air) is about 500 to 5,000 cc, preferably 1,000 to 4,000, most preferably 1,200 to 2,500 cc (STP) per pound of polymer processed. This provides a basis for calculating the amount of active oxygen required. Thus, generally a gas containing 15 to 25, preferably 17 to 22, and most preferably 18 to 20 weight percent oxygen is suitable.

It has been found, that if the temperature is raised much over the limits specified or the air rate is raised above the rates specified, the result is loss of reaction and resultant polymer discoloration, without additional polymer chain scission.

The invention is further illustrated by the following example.

EXAMPLE 1

In a standard single screw 2 inch Egan extruder, a polypropylene powder having a 0.3 MFR was introduced without any precautions to avoid contacting with air. The extruder had a feed section, a mixing section, transition section and metering section.

The temperature in the transition section was maintained at about 500° to 600° F. but the temperature in the metering section was maintained between 400° and 450° F. Air was injected into the metering section at a pressure of about 1,800 psig at an approximate rate of 1,800 cc (STP) per pound of polypropylene utilizing a bank of four commonly manifolded dry and pure air cylinders compressed at a pressure of 2,300 lbs. psig at a temperature between 400° and 450° F.

The polymer obtained from the extruder was tested. It had about a 38 MFR and a 2.0 die swell.

What is claimed is:

1. In the process for the controlled scission of polypropylene having a shear stress above 22 and a die swell of from 1 to 12 in conformance with the starting polymers designated on the viscoelastic grid in an extruder-reactor in which molten polypropylene is conveyed under shear through a mixing zone, a reactor zone, and a metering zone, in said extruder-reactor, the improvement in effecting rheology changes in said polypropylene which comprises:
   the high pressure injection of a gas containing from 15 to 25 wt. percent oxygen under pressure into said metering zone at a rate of 500 to 5000 cc of said gas per pound of said molten polypropylene, wherein
   said metering zone is maintained at a temperature of about 50° to 400° F. lower than the temperature of said reactor zone
whereby critical end-use specifications of die swell, MFR and shear stress can be met with not more than two passes of said polypropylene through said extruder-reactor.

2. The process according to claim 1 wherein said polymer is polypropylene.

3. The process according to claim 1 wherein said temperature in said metering zone is about 350° to 500° F.

4. The process according to claim 1 wherein said polymer is processed in such manner only once.

5. A process according to claim 1 wherein said polymer is polypropylene, said gas is air, said temperature is 350° to 500° F. and said air is injected at a pressure of 1,200 to 5,000 psig at a rate of 500 to 5,000 cc per pound of polypropylene.

6. A method according to claim 5 wherein said procedure is carried out only once.

7. A method according to claim 1 wherein said resulting polymer has a die swell of −0.5 to 2 and a MFR of 20 to 50.

8. A method according to claim 1 wherein said resulting polymer has a die swell of 2 to 4 and a MFR of 4 to 9.

9. A method according to claim 1 wherein said resulting polymer has a die swell of 0.1 to 4 and an MFR of 40 to 60.

* * * * *